has been extended or adjusted under 35 U.S.C. 154(b) by 167 days.

United States Patent
Raimann

(10) Patent No.: US 12,451,806 B2
(45) Date of Patent: Oct. 21, 2025

(54) BALANCED BOOST DC/DC CONVERTER

(71) Applicant: ZF Friedrichshafen AG, Friedrichshafen (DE)

(72) Inventor: Manuel Raimann, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 167 days.

(21) Appl. No.: 18/355,208

(22) Filed: Jul. 19, 2023

(65) Prior Publication Data
US 2024/0030816 A1    Jan. 25, 2024

(30) Foreign Application Priority Data
Jul. 21, 2022   (DE) .......................... 102022207433.5

(51) Int. Cl.
*H02M 3/158*    (2006.01)
*B60L 50/70*    (2019.01)

(52) U.S. Cl.
CPC ............. *H02M 3/158* (2013.01); *B60L 50/70* (2019.02); *B60L 2210/14* (2013.01)

(58) Field of Classification Search
CPC ...... H02M 3/158; B60L 50/70; B60L 2210/14
See application file for complete search history.

(56) References Cited

U.S. PATENT DOCUMENTS

| | | | |
|---|---|---|---|
| 2009/0085537 A1 | 4/2009 | Nakabayashi et al. | |
| 2021/0309116 A1* | 10/2021 | Breu | H02M 3/158 |
| 2022/0360176 A1* | 11/2022 | Giuntini | H02M 3/155 |
| 2023/0170507 A1* | 6/2023 | Shimizu | B60L 58/30 |

FOREIGN PATENT DOCUMENTS

| | | |
|---|---|---|
| CN | 101867314 A | 10/2010 |
| CN | 109367417 A | 2/2019 |
| DE | 10 2007 034 450 A1 | 1/2008 |
| EP | 2 517 344 B1 | 4/2013 |

OTHER PUBLICATIONS

Office Action dated Jan. 13, 2023 for German Patent Application No. 10 2022 207 433.5 (12 pp.), note: pp. 1 and 2 are English language Explanations to Section C. Result of Determination Document.

* cited by examiner

*Primary Examiner* — Zoheb S Imtiaz
(74) *Attorney, Agent, or Firm* — Crowell & Moring LLP

(57) ABSTRACT

A symmetrical DC-to-DC boost converter includes a DC input voltage source with a negative DC voltage input and a positive DC voltage input, a negative DC and positive DC voltage output, at least four switches, and two chokes, one of which is connected to the negative DC voltage input and two adjacent switches, and the other of which is connected to the positive DC voltage input and two other adjacent switches, such that a symmetrical topology with separate DC voltage inputs is obtained. Furthermore, there is an input capacitor between the voltage inputs and a first symmetry capacitor connected to the negative DC voltage input and the negative DC voltage output, as well as a second symmetry capacitor connected to the positive DC voltage input and the positive DC voltage output.

13 Claims, 1 Drawing Sheet

BALANCED BOOST DC/DC CONVERTER

CROSS-REFERENCE TO RELATED APPLICATION

This application claims priority to German Application No. DE 10 2022 207 433.5, filed on Jul. 21, 2022, the entirety of which is hereby fully incorporated by reference herein.

FIELD

The present invention relates to the field of electric vehicles, in particular the booster DC-to-DC converters for an electric motor in a motor vehicle powered by fuel cells.

Electronic modules such as power electronics modules have been used to an increasing extent in motor vehicles in the last decades. This is partially due to the necessity of conserving fuels and improving vehicle performance, as well as to the progress made in semiconductor technologies.

BACKGROUND AND SUMMARY

A DC-to-DC boost converter is used to create a high voltage internal electrical system and thus provide electricity to an electric motor from a fuel cell. This increases the voltage from the fuel cell to a predefined extent, and then supplies this voltage to the high voltage internal electrical system. One problem with this is that there is a direct connection between the terminals in the fuel cells and the high voltage internal electrical system when using the DC-to-DC boost converters, resulting in an undesired asymmetry in the isolated voltages to the vehicle chassis.

An object of the invention is to therefore create a DC-to-DC boost converter with which the asymmetry in the isolated voltages can be reduced or substantially eliminated.

This problem is solved by the features as disclosed herein. Advantageous embodiments are also the subject matter of the present disclosure.

A symmetrical DC-to-DC boost converter is proposed that has a DC input voltage source with a negative DC voltage input and a positive DC voltage input, a negative and positive DC voltage output, at least four switches, and two chokes, one of which is connected to the negative DC voltage input and two adjacent switches, and the other of which is connected to the positive DC voltage input and two other adjacent switches, such that a symmetrical topology is obtained with separate DC voltage inputs. There is also a first input capacitor between the voltage inputs and a first symmetry capacitor connected to the negative DC voltage input and the negative DC voltage output, as well as a second symmetry capacitor connected to the positive DC voltage input and the positive DC voltage output.

In one embodiment, the chokes are coupled magnetically.

The DC-to-DC boost converter in one embodiment is a bidirectional DC-to-DC boost converter, and the switches are semiconductor switches. In an alternative embodiment, the DC-to-DC boost converter is a unidirectional DC-to-DC boost converter, and the switches are diodes.

Output capacitors are also placed between the switches and the DC voltage outputs in one embodiment.

Use of the DC-to-DC boost converter in a motor vehicle powered by a fuel cell is also proposed.

A fuel cell drive for a motor vehicle is also proposed, which contains a fuel cell and the DC-to-DC boost converter, in which the DC voltage inputs in the DC-to-DC boost converter are connected to the fuel cell, and the DC voltage outputs are connected as DC voltage inputs to a high voltage internal electrical system in a motor vehicle that has an electric motor.

A motor vehicle is also proposed, which has an electric motor powered by the fuel cell drive.

Further features and advantages of the invention can be derived from the following description of exemplary embodiments of the invention based on the drawings showing details of the invention, and the claims. The individual features can be obtained in and of themselves or in arbitrary combinations in various versions of the invention.

Preferred embodiments of the invention shall be explained in greater detail below in reference to the drawings.

DETAILED DESCRIPTION

Figure 1:
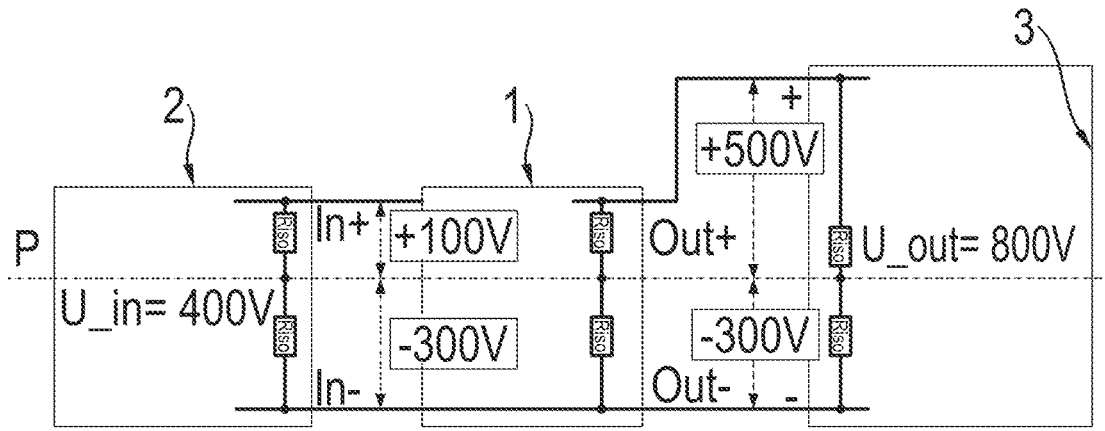
FIG. 1 shows a fundamental structure of a fuel cell system that has an asymmetrical DC-to-DC boost converter according to the prior art.

Identical elements and functions are given the same reference symbols in the following descriptions of the drawings.

As stated above, one aim of the present disclosure is to reduce the asymmetry in the isolation voltages to the vehicle chassis.

DC-to-DC boost converters 1 are also referred to as step-up converters, or simply boost converters. With this type of converter, the output voltage is always higher than the input voltage. These DC-to-DC boost converters 1 (simply referred to as DC-to-DC converters 1 below) can therefore be used in the field of drive engineering in motor vehicles. In particular, they are suitable for use in the framework of drives comprising fuel cells 2. The DC-to-DC boost converter 1 in this case converts an input voltage U_in of e.g. 400V from the energy source (the fuel cell 2) to an output voltage of e.g. 800V for the high-voltage internal electrical system 3 connected to the DC-to-DC boost converter 1 (abbreviated: HV internal electrical system 3), and therefore to the drive in the form of an electric motor.

The fundamental structure of DC-to-DC converters 1 is known, and shall not be repeated for this reason. FIG. 1 shows a fuel cell system comprising a fuel cell 2, a DC-to-DC converter 1 according to the prior art, connected thereto, and an HV internal electrical system 3 connected to this. It can be seen here that because of the topology of the DC-to-DC converter 1, there is a direct connection between the negative DC voltage inputs In− from the fuel cell 2 and the negative DC voltage outputs Out− toward the HV internal electrical system 3. This results in an asymmetry in the isolation voltages to the potential P on the vehicle chassis, as indicated by way of example in FIG. 1 through the different voltages (+100V/−300V at the input for the DC-to-DC converter 1, and +500V/−300V at the output for the DC-to-DC converter 1). The disadvantage with current DC-to-DC converters is that a higher continuous voltage than half of the HV voltage is applied to the components in the HV internal electrical system, which can reduce the service life of these components. Furthermore, this asymmetry not favorable regarding clearance and creepage distance requirements, as well as the service life for insulating materials.

Because the DC-to-DC converter 1 must assume the entire drive performance, galvanic separation makes little sense. For this reason, another solution to the problem is needed in order to prevent asymmetry in the isolation voltages to the vehicle chassis.

To resolve this problem, a symmetrical DC-to-DC converter topology that has separate negative and positive DC voltage inputs In−; In+ is proposed, such as that illustrated in FIGS. 2 and 3. FIG. 3 shows a circuit design in detail for the DC-to-DC boost converter 1 shown as a black box in FIG. 2. It can already be seen from FIG. 2 that there is no longer a direct connection between the negative and positive DC voltage inputs In−; In+ at the fuel cell 2 end and the HV internal electrical system 3.

Figure 2:
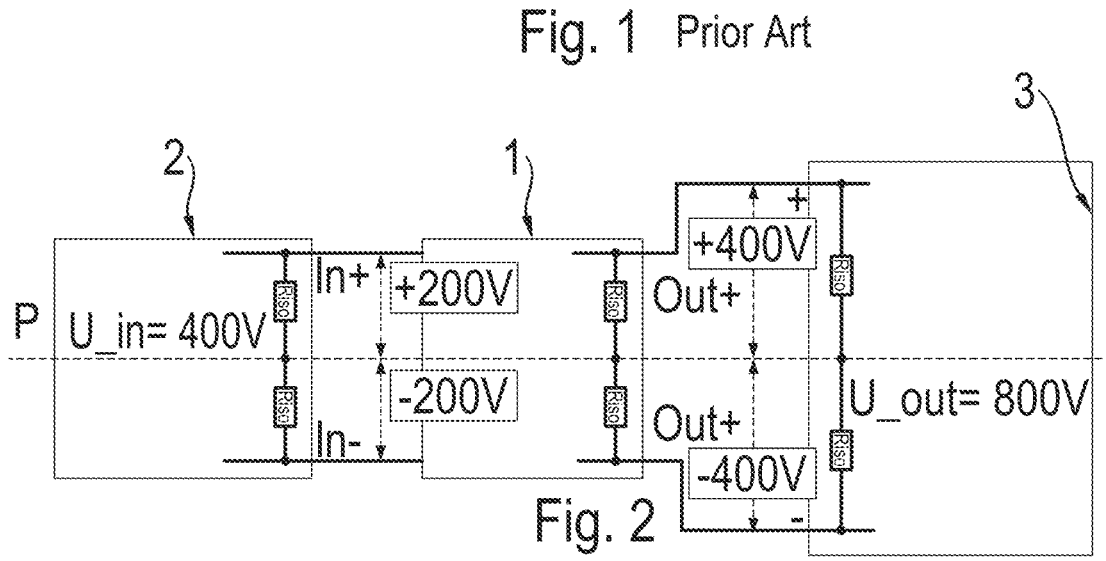
FIG. 2 shows a fundamental structure of a fuel cell system that has a symmetrical DC-to-DC boost converter according to one embodiment of the present invention.
Figure 3:
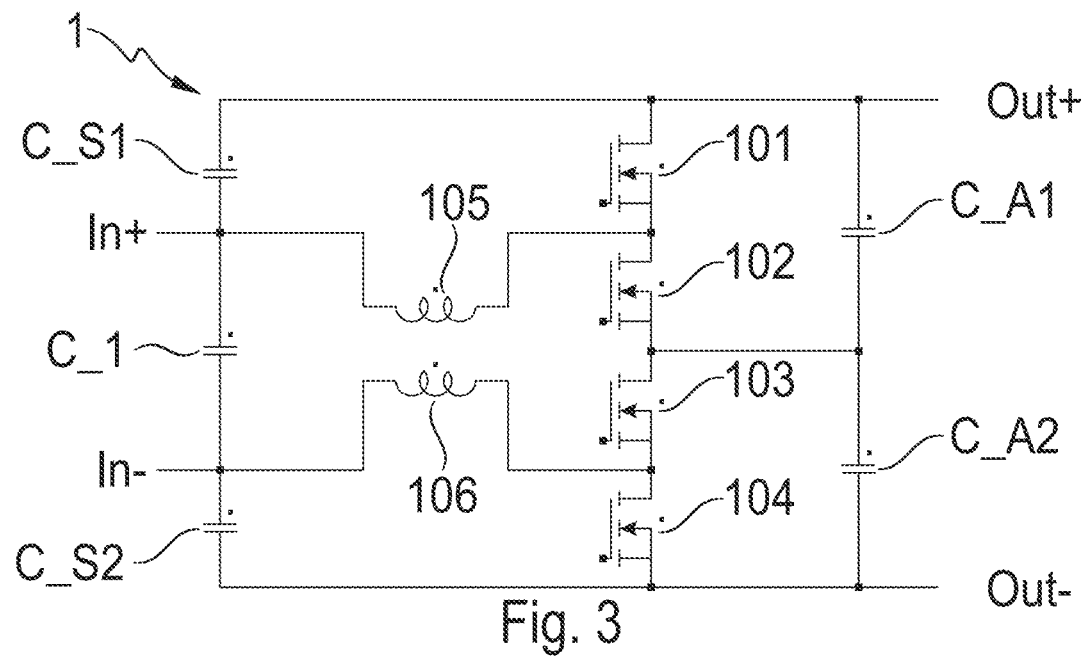
FIG. 3 shows a circuit configuration for the DC-to-DC boost converter shown in FIG. 2.

As shown in FIG. 2, the symmetrical DC-to-DC converter topology shown in FIG. 3 results in a symmetrical distribution of the input voltage U_in in the DC-to-DC converter 1, which is 400V in this embodiment, to 200V each. A symmetrical distribution of the input voltages to the HV internal electrical system 3, corresponding to the output voltage U_out of the DC-to-DC converter 1, is also obtained. In this embodiment, this is 800V, which is divided into 400V each. In order to achieve this, a symmetrically structured multi-level DC-to-DC converter 1 is placed between the fuel cells 2 and the HV internal electrical system 3, which has two chokes 105, 106 in the DC-to-DC converter 1, through which a symmetrical distribution of the input voltage U_in in the DC-to-DC converter 1 can take place. The chokes 105, 106 can be separated from one another or coupled magnetically.

The circuit design shall be explained in greater detail below in reference to FIG. 3. In this embodiment, the switches 101-104 are semiconductor switches 101, 102, and 103, 104, each of which forms a half bridge.

The choke 105 is electrically connected at one end to the positive DC voltage input In+. At the other end, it is electrically connected to a point in the middle between the two adjacent switches 101, 102. The two other ends of the switch 101, 102, i.e. the ends not connected to the choke 105, are connected to the negative DC and positive DC voltage outputs Out−; Out+.

The same circuit arrangement is mirrored for the negative DC voltage input In−, in order to obtain a symmetrical structure. This means that the choke 106 is electrically connected at one end to the negative DC voltage input In−, and electrically connected at the other end to a point in the middle between the two other adjacent switches 103, 104.

As explained above, there are at least four switches 101-104 connected in series that are connected to the chokes 105, 106 in this embodiment, such that there are at least three topological levels. There can also be more topological levels, i.e. more than four switches 101-104.

To obtain symmetry, the two adjacent switches 101, 102 are connected to the choke 105, and therefore to the positive DC voltage input In+, and the other two adjacent switches 103, 104 are connected to the choke 106, and therefore to the negative DC voltage input In−. This means that there can be two separate intermediate circuits in the HV internal electrical system 3, which are each controlled by two switches 101, 102 or 103, 104 lying above one another (in FIG. 3).

Output capacitors C_A1; C_A2 connected in series are provided between the switches 101-104 and the negative and positive voltage outputs Out−; Out+, which form individual capacitors C_A1; C_A2 in the embodiment shown in FIG. 3.

There is a voltage tap between each of the pairs of switches 101, 102 and 103, 104 connected in series, each of which has a dedicated coil 105 and 106, and therefore another DC voltage input In−, In+, which in turn is connected between the output capacitors C_A1; C_A2. The respective ends of the output capacitors C_A1; C_A2 are connected to the negative DC and Positive DC voltage outputs Out−; Out+.

At the inputs to the coils 105, 106, at which they are electrically connected to the power source, i.e. the fuel cell 2, there are three capacitors C1, C_S1, C_S2, connected in series. The input capacitor C_1 is connected at an output to the positive DC voltage input In+, and at the other end to the negative DC voltage input In−. The symmetry capacitor C_S1 for the positive DC voltage input In+ is also connected at one end to the positive DC voltage input In+. At its other end, it is connected to the positive DC voltage output Out+ (as is also an output of the switch 101 and one end of the output capacitor C_A1). The symmetry capacitor C_S2 for the negative DC voltage input In− is also connected at one end to the negative DC voltage input In−. At its other end, it is connected to the negative DC voltage output Out− (as is also the case with an output of the switch 104 and one end of the output capacitor C_A2).

The input capacitor C_1 prevents the potential from jumping between the DC voltage inputs In−; In+. The two symmetry capacitors C_S1 and C_S2 prevent the potential from jumping between the positive DC voltage input In+ and the significantly higher potential at the positive DC voltage output Out+ and between the negative DC voltage input In− and the significantly higher potential at the negative DC voltage output Out−.

There are also insulation resistors R_iso shown in FIGS. 1 and 2. This are not part of the invention, and are only shown for purposes of completeness.

An electronics module in the framework of this invention is used to operate an electric motor in a motor vehicle powered by a fuel cell. The motor vehicle is a commercial vehicle in particular, such as a truck or bus, or a passenger automobile. The power electronics module comprises a DC/AC inverter. It can also comprise an AC/DC rectifier, DC-to-DC converter, transformer, and/or another electrical converter or a part of such a converter, or a part thereof. In particular, the power electronics module is used to provide electricity to an electrical machine, e.g. an electric motor and/or a generator. A DC/AC inverter is preferably used to generate a multi-phase alternating current from a direct current generated by a DC voltage of a power source such as a battery. A DC-to-DC converter is used to convert (boost) a direct current from a fuel cell into a direct current that can be used by the HV internal electrical system 3 for the drive for example.

DC-to-DC converters and inverters for electric drives in vehicles, in particular passenger automobiles and utility vehicles, as well as buses, are configured for the high voltage range and configured in particular for a cut-off voltage class starting at ca. 650 volts.

LIST OF REFERENCE SYMBOLS

1 DC-to-DC boost converter
101-104 switch
105, 106 choke
C_1 input capacitor C_S1; C_S2 symmetry capacitor
C_A1; C_A2 output capacitors
In−; In+ DC voltage inputs
Out−; Out+ DC voltage outputs
U_in input voltage
U_out output voltage
P potential vehicle chassis
2 fuel cell
3 HV internal electrical system

The invention claimed is:

1. A symmetrical DC-to-DC boost converter, comprising:
a DC input voltage source that has a negative DC voltage input and a positive DC voltage input;
a negative DC and a positive DC voltage output;
at least four switches;
two chokes, one of which is connected to the negative DC voltage input and two adjacent switches, and the other of which is connected to the positive DC voltage input and two other adjacent switches, such that a symmetrical topology with separate DC voltage inputs is obtained;
an input capacitor between the voltage inputs;
a first symmetry capacitor connected to the negative DC voltage input and the negative DC voltage output such that the first symmetry capacitor is connected across the negative DC voltage input and the negative DC voltage output; and
a second symmetry capacitor connected to the positive DC voltage input and the positive DC voltage output such that the second symmetry capacitor is connected across the positive DC voltage input and the positive DC voltage output.

2. The symmetrical DC-to-DC boost converter according to claim 1, wherein the chokes are coupled magnetically.

3. The symmetrical DC-to-DC boost converter according to claim 1, wherein the DC-to-DC boost converter is a bidirectional DC-to-DC boost converter, and the switches are semiconductor switches.

4. The symmetrical DC-to-DC boost converter according to claim 1, wherein the DC-to-DC boost converter is a unidirectional DC-to-DC boost converter, and the switches are diodes.

5. The symmetrical DC-to-DC boost converter according to claim 1, comprising:
output capacitors placed between the switches and the DC voltage outputs, wherein the output capacitors are different from the input capacitor, the first symmetry capacitor, and the second symmetry capacitor.

6. A motor vehicle comprising:
the DC-to-DC boost converter according to claim 1; and
a fuel cell,
wherein the DC-to-DC boost converter is used with the fuel cell.

7. A fuel cell drive for a motor vehicle, comprising:
a fuel cell; and
the DC-to-DC boost converter according to claim 1,
wherein the DC voltage inputs for the DC-to-DC boost converter are connected to the fuel cell and the DC voltage outputs are connected as DC voltage inputs to a high voltage internal electrical system in the motor vehicle that has an electric motor.

8. A motor vehicle comprising:
an electric motor powered by the fuel cell drive according to claim 7.

9. The symmetrical DC-to-DC boost converter according to claim 2, wherein the DC-to-DC boost converter is a bidirectional DC-to-DC boost converter, and the switches are semiconductor switches.

10. The symmetrical DC-to-DC boost converter according to claim 2, wherein the DC-to-DC boost converter is a unidirectional DC-to-DC boost converter, and the switches are diodes.

11. The symmetrical DC-to-DC boost converter according to claim 2, comprising:
output capacitors placed between the switches and the DC voltage outputs.

12. A motor vehicle comprising:
the DC-to-DC boost converter according to claim 2; and
a fuel cell,
wherein the DC-to-DC boost converter is used with the fuel cell.

13. The symmetrical DC-to-DC boost converter according to claim 1,
wherein the first symmetry capacitor is directly connected to the negative DC voltage input and the negative DC voltage output, and
wherein the second symmetry capacitor is directly connected to the positive DC voltage output and the positive DC voltage output.

* * * * *